United States Patent [19]

Jackson et al.

[11] Patent Number: 4,580,706

[45] Date of Patent: Apr. 8, 1986

[54] SADDLEBAG AND ASSOCIATED MOUNTING ARRANGEMENT FOR CYCLES

[76] Inventors: W. Shaun Jackson, 2860 Tessmer Rd.; Leslie E. Bohm, 1614 Argyle Crescent, both of Ann Arbor, Mich. 48103

[21] Appl. No.: 650,999

[22] Filed: Sep. 17, 1984

Related U.S. Application Data

[63] Continuation of Ser. No. 430,549, Sep. 30, 1982, abandoned, and a continuation-in-part of Ser. No. 339,273, Jan. 15, 1982, Pat. No. 4,418,850, which is a continuation of Ser. No. 84,400, Oct. 24, 1979, abandoned, which is a continuation-in-part of Ser. No. 768,467, Feb. 14, 1977, Pat. No. 4,174,795.

[51] Int. Cl.$^4$ ............................................. B62J 9/00
[52] U.S. Cl. .................................... 224/32 A; 224/31
[58] Field of Search ............... 224/32 R, 32 A, 33 R, 224/224, 153, 151; 190/41, 52; 222/901, 905, 751, 153; 280/289 A, 202, 769; 150/49, 52 E, 52 J

[56] References Cited

U.S. PATENT DOCUMENTS

| | | | |
|---|---|---|---|
| 1,401,660 | 12/1921 | White | 224/42.45 R |
| 1,963,333 | 6/1934 | Morales | 224/32 A |
| 2,504,738 | 4/1950 | Shields | 224/905 X |
| 2,711,234 | 6/1955 | Rubens | 190/26 |
| 3,716,938 | 2/1973 | Ammons | 150/49 X |
| 3,729,038 | 4/1973 | Ekeson | 150/52 E |
| 3,901,360 | 8/1975 | Cook | 150/52 R X |
| 3,937,374 | 2/1976 | Hine, Jr. | 224/32 A |
| 4,018,369 | 4/1977 | Jaeger | 224/209 |
| 4,029,243 | 6/1977 | Zerobnick et al. | 224/224 |
| 4,059,207 | 11/1977 | Jackson et al. | 224/32 R X |
| 4,210,186 | 7/1980 | Belenson | 150/52 J |
| 4,212,377 | 7/1980 | Weinreb | 150/52 J X |
| 4,262,829 | 4/1981 | Hine, Jr. et al. | 224/32 R |
| 4,271,996 | 6/1981 | Montgomery | 224/32 A |
| 4,320,863 | 3/1982 | Lyer et al. | 224/901 X |
| 4,424,841 | 1/1984 | Smith | 224/151 X |

FOREIGN PATENT DOCUMENTS

| | | | |
|---|---|---|---|
| 1086064 | 2/1955 | France | 224/32 A |
| 83446 | 12/1956 | Netherlands | 224/30 R |
| 237539 | 8/1945 | Switzerland | 224/209 |
| 237293 | 8/1945 | Switzerland | 224/151 |
| 242067 | 4/1946 | Switzerland | 224/32 A |

Primary Examiner—Stephen Marcus
Assistant Examiner—Robert Petrik
Attorney, Agent, or Firm—Krass & Young

[57] ABSTRACT

In one embodiment the saddlebag includes a cutaway in the forward lower corner portion thereof to provide a heel clearance for a passenger on the cycle. A substantially solid panel is affixed to the interior rear of the bag and an elongated attachment plate is provided on the exterior rear of the saddlebag. A U-shaped bar pivotally mounted to the interior panel is advantageously employed as part of the internal frame construction for the bag. The bags are mounted on the cycle by way of a first pair of straps secured to spaced locations on the seat and a second pair of straps removably connected thereto. The ends of the straps of the second pair are detachably secured to the attachment plate on the saddlebags. A rigid strap mounted to a fixed part of the cycle is adapted to receive a connector extending from the lower front side of the saddlebag. A rear strap connecting the rear portions of a pair of saddlebags is also provided. Each saddlebag may include detachable exhaust/abrasion shields.

8 Claims, 7 Drawing Figures

SADDLEBAG AND ASSOCIATED MOUNTING ARRANGEMENT FOR CYCLES

CROSS REFERENCE TO RELATED APPLICATIONS

This application is a continuation of application Ser. No. 430,549 filed 9-30-82, now abandoned, and of U.S. Ser. No. 339,273, filed Jan. 15, 1982, now U.S. Pat. No. 4,481,850, which is a Continuation of U.S. Ser. No. 84,400, filed Oct. 24, 1979 (now abandoned), which is a Continuation-In-Part of U.S. Ser. No. 768,467, filed Feb. 14, 1977, now U.S. Pat. No. 4,174,795.

TECHNICAL FIELD

This invention relates to panniers for cycle vehicles and, more particularly, to saddlebags and mounting arrangements therefore.

BACKGROUND ART

The number of people experiencing the enjoyment of touring on bicycles, mopeds or motorcycles has been steadily increasing over the years. Cycles have replaced the use of automobiles for travelling to work, school, the grocery store and other places where it is necessary for the rider to carry various objects on the cycle to and from his destination. Panniers, as they are referred to in the trade, may take various forms such as saddlebags, packs, baskets and the like.

Saddlebags are particularly useful for motorcycle touring over an extended period of time. Some Saddlebags take the form of rigid containers affixed to the rear sides of the motorcycle. These constructions, unfortunately, unduly increase the weight of the cycle and are not readily removable. Many known arrangements also require semi-permanent attachment of large amounts of hardware to the cycle.

To overcome this problem it would be highly advantageous to employ a lightweight saddlebag arrangement that can be used both on and off the cycle as pieces of luggage without the need for distracting hardware. Unfortunately, this noteworthy objective is not easily achieved. Such an arrangement not only requires that the saddlebags be removably attached to the cycle, but they also must be mounted in such a manner that they do not impede safe operation of the motorcycle or comfort of the passenger. Flexible, lightweight saddlebags have their advantages because it is easy to manually carry them after removal from the cycle. However, they are ordinarily not designed to withstand the road abuse and their flexible sides may interfere with the spokes of the rear wheel when hanging from the side of the seat. It is also difficult to load/unload flexible bags because of their tendency to sag. Additionally, the load distribution of the objects in the bag may become uneven, resulting in an unpredictable sway of the bag caused by shifts in the load.

Finally, it is of utmost importance that the saddlebags be securely fastened to the cycle and remain in a stable position when encountering the high wind forces typically experienced at highway speeds. The saddlebag mounting arrangement not only must accomplish this objective but it also would be highly desirable to employ a mounting arrangement that could be used on a variety of different cycle constructions without requiring substantial modifications of the cycle to effectuate the saddlebag mounting arrangement.

The present invention is directed to solving one or more of these problems.

SUMMARY OF THE INVENTION

The various features of this invention that will be described each have individual utility but, taken together, cooperate to form a saddlebag mounting arrangement of an exceedingly superior design accomplishing a multitude of objectives such as those noted above. Consequently, the foregoing features may be used individually or in combination.

One aspect of this invention is the provision of a flexible saddlebag with a cutaway portion in the lower corner of the front side of the bag to provide heel clearance for the passenger on the cycle. A substantially solid panel generally conforming to the interior inner face of the bag provides structural definition therefore and prevents interference between the bag and the wheel of the cycle to which it is adjacently mounted. A U-shaped bar pivotally connected to the panel in a outwardly forward inclined position holds the bag in an open condition to aid in loading/unloading thereof and evenly distributes the load therein.

As used in this Specification, the front or forward portion of the saddlebag mounting arrangement shall be that portion which is nearest the forward end of the cycle when the saddlebag is installed thereon. The rear or back portion of the saddlebag shall be that which is nearest the rear end of the cycle when the saddlebag is mounted thereon, the inside face or inner portion of the saddlebag shall mean that face that is nearest the cycle, running generally parallel thereto, when the saddlebag is installed thereon, and the outside face or outer portion of the saddlebag shall mean that portion of the saddlebag which is generally parallel to the cycle and the farthest therefrom when the saddlebag is mounted thereon.

An abrasion shield detachably connected to the bottom and inner face of the bag protects the bag from damage due to exhaust, abrasion, road abuse, etc. Means are provided for releasably securing a front portion of the bag to a fixed part of the cycle. When a pair of saddlebags are employed, a rear stablizer strap is also used to connect the two saddlebags together.

The mounting arrangement for the saddlebags advantageously employs a first pair of straps secured to spaced locations on the seat. The straps preferably have Velcro material of a first type on an upper surface thereof bridging the top surface of the seat. A second pair of straps having Velcro material of a second type on their lower surfaces are removably mounted to the Velcro material of the first type on the first pair of straps. The ends of the second pair of straps are detachably connected to spaced locations on each of the saddlebags. Preferably, each saddlebag includes a rigid attachment plate having a plurality of spaced attachment points to accomodate different strap spacings on the seat. The attachment plate serves to distribute the load across the entire top of the bag.

The attachment harness enables easy adjustment for seat width and contour, as well as saddlebag height and tilt. Each bag may be readily removed independently of the other bag. If desired, both bags may be removed and connected together so that they may be carried as an integral unit. In the preferred embodiment, the bags include a removable auxiliary pack adapted to be worn around the waist of the user.

BRIEF DESCRIPTION OF THE DRAWINGS

Still other objects and adantages of the present invention will become apparent to one skilled in the art from a study of the following specification and by reference to the drawings in which.

DESCRIPTION OF THE PREFERRED EMBODIMENT

Figures 1, 2:
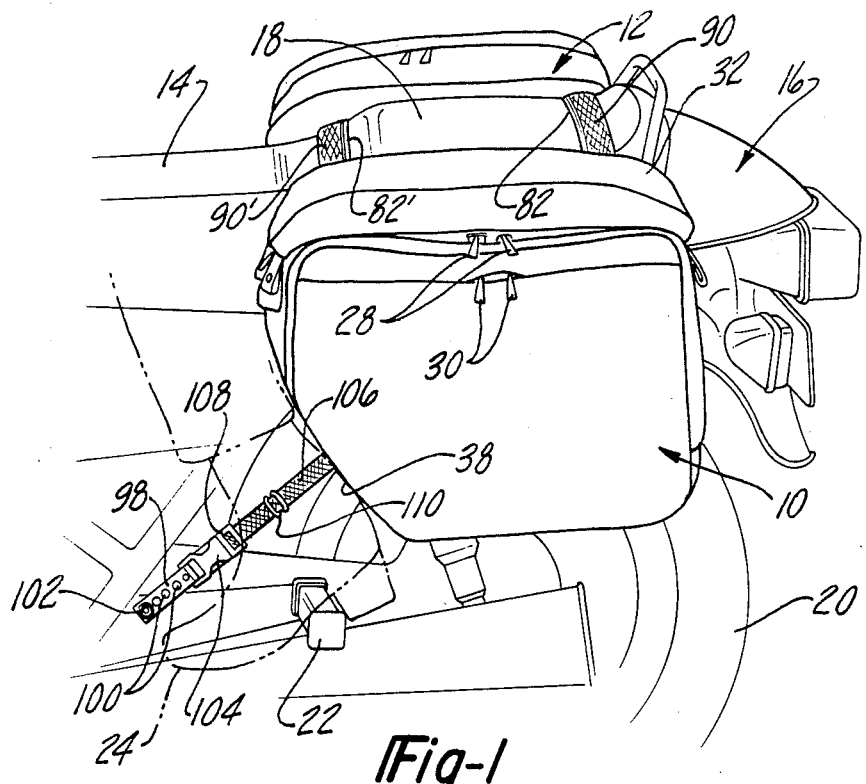
FIG. 1 is a perspective view showing a pair of saddlebags mounted on the seat of a motorcycle in the manner taught by the preferred embodiment of the invention.
FIG. 2 is a rear view with parts cut away of the saddlebag mounting arrangement of FIG. 1.

Turning now to FIGS. 1 and 2, the preferred embodiment of the present invention employs a pair of saddlebags 10 and 12 mounted on a seat 14 of a motorcycle 16. The seat shown in FIG. 1 includes a contoured rear passenger seat portion 18 commonly found on present day motorcycles. Motorcycle 16 conventionally employs a driven rear wheel 20 and a foot rest 22 for the boot of the passenger as shown in phantom lines and designed by the numeral 24.

Figure 7:
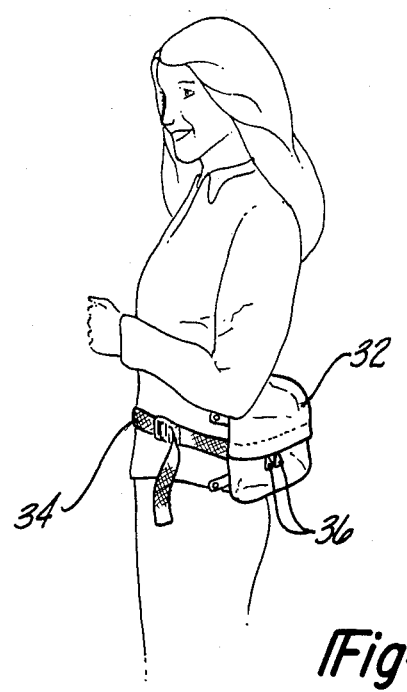
FIG. 7 is a perspective view of an auxiliary pack worn about the waist of a person.

Saddlebags 10, 12 are preferably constructed of 11-oz. urethane-coated cordura nylon, chosen for maximum strength and abrasion resistance. In this embodiment bags 10, 12 include an interior main compartment 26 having zippered access opening 28 and an outside flap pocket with zippers 30. Preferably, a detachable auxiliary "fanny pack" 32 snaps securely to the top of the bag by way of a pair of snaps on each end. As shown in FIG. 7, pack 32 is designed to be removed from the main bag and secured around the waist in the back of the cyclist and/or passenger by way of an adjusted belt 34. Zippers 36 provide access to the interior of pack 32.

Figure 3:
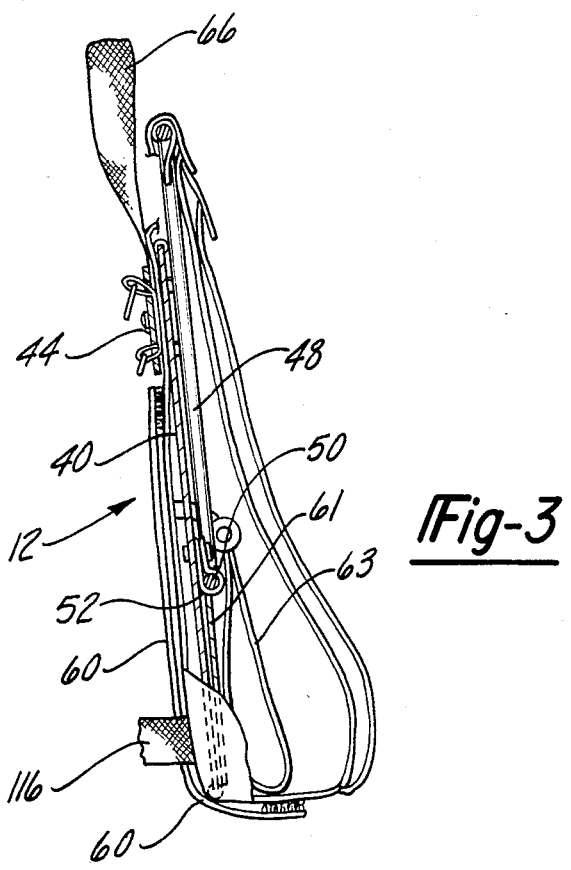
FIG. 3 is a partial view showing one of the saddlebags in a collapsed condition.
Figure 4:
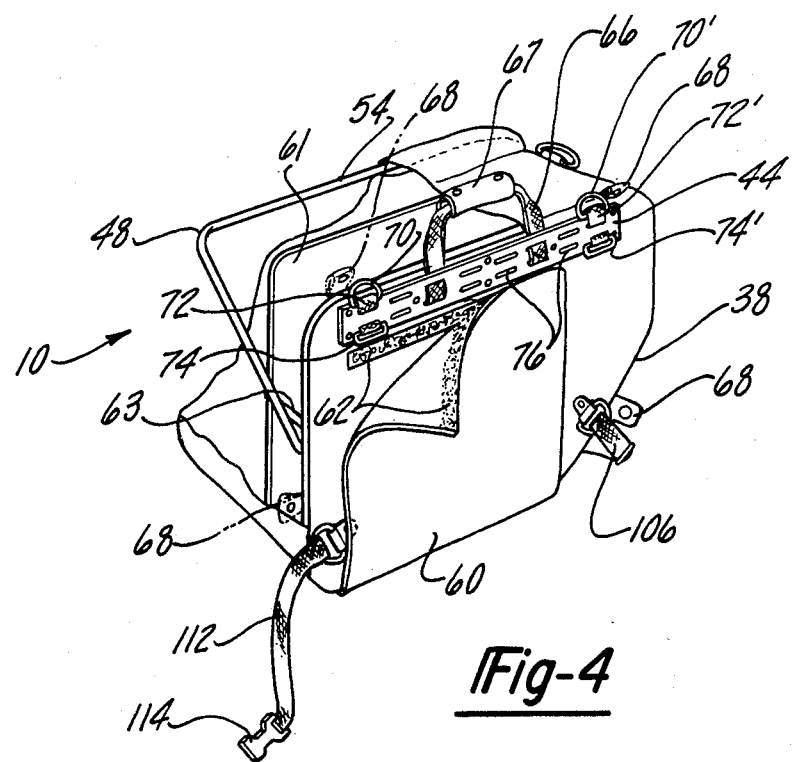
FIG. 4 is a perspective view with parts cut away of a saddlebag made in accordance with the preferred embodiment of the invention.

A particular advantageous aspect of the saddlebag design is the cutaway in the lower corner of the front portion of bags 10 and 12. Cutaway 38 is indented from the projections of the front and bottom of the bag to thereby provide heel clearance for a passenger on the cycle. Further details of the saddlebag construction and mounting arrangement therefore are shown in FIGS. 2-4. Each of the bags utilizes an internal frame employing a substantially solid panel 40. Panel 40 is substantially coextensive with the inner face of its associated bag, extending downwardly to the bottom of the bag. In the preferred embodiment panel 40 is made of aluminum and includes a plastic guard 42 on its edges to prevent damage to the bag. Panel 40 provides definition for the flexible bag and prevents it from sagging into interference with the rear wheel. Panel 40 is secured to the inside face of the flexible bag and this can be accomplished in a variety of ways. In the preferred embodiment the upper inner portion of the bag is sandwiched between panel 40 and an attachment plate 44. Panel 40 includes a series of threaded holes therein with pressed-in threaded inserts for receipt of threaded fasteners such as screws 46. More will be said about attachment plate 44 later herein.

Figure 5:
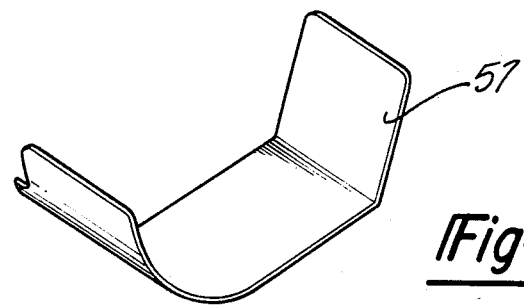
FIG. 5 is a perspective view of a stiffner panel for the bottom of the bags.

Completing the internal frame construction, a U-shaped bar 48 has opposed ends 50 pivotally connected to opposite sides of panel 40 by way of bushing-type clips 52. The horizontally extending central portion 54 of bar 48 is secured to the top outer edge of its associated bag, for example, by looping and stitching a portion of the bag material as represented by the numeral 56. Definition of the bottom of the bag is provided by a stiffner panel 57 (see FIG. 5) whose opposite ends are tucked within pockets 59 formed in the interior compartment 26. A divider 61 is advantageously employed in compartment 26 to separate clothing from other articles. A cord 63 connected to the rear of the bag passes through edges of divider 61 and then through a hole in slideable member 65 to hold divider 61 securely against the clothes.

When U-shaped bar 48 is in an inclined position relative to panel 40 the bag is in an extended condition to aid in loading/unloading thereof and to promote even distribution of the load therein. FIG. 2 shows bag 12 in this extended, normally used condition. The bag may be collapsed somewhat for storage and other purposes by removing a stiffner 57 and pivoting bar 48 inwardly as shown in FIG. 3.

Bags 10, 12 advantageously include an exhaust/abrasion shield 60 detachably mounted to the bottom and inside face thereof to protect the bags from exhaust, abrasion and the like. Shields 60 may be made of any suitable material such as plastic, rubber, leather and the like. Such a material is subject to normal wear while protecting the fabric and, thus, may be detached and replaced when necessary. In the preferred embodiment this is provided by way of an upper pair of Velcro strips 62 and a lower pair of Velcro strips 64.

Figure 6:
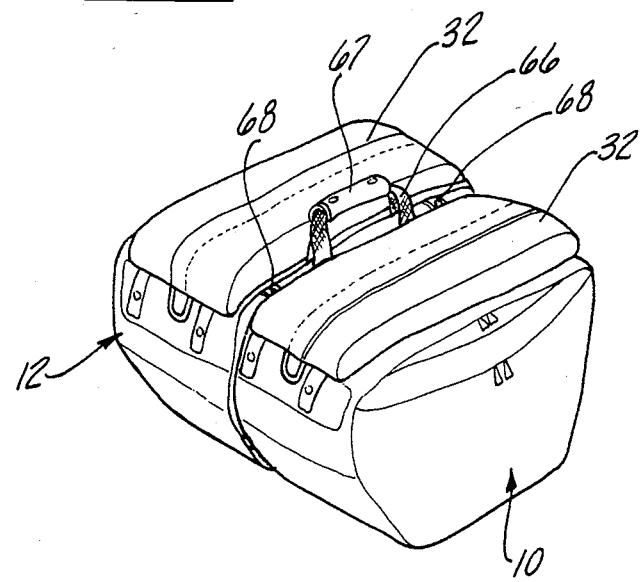
FIG. 6 is a perspective view showing two bags connected together for off cycle carrying.

Each of the saddlebags also includes a handle 66 connected to attachment plate 44. One of the handles 66 includes a leather grip 67 with snaps 69. When removed from the cycle the pair of bags may be snapped together and carried as a single unit by the provision of snaps 68 on the corners of the bags, with grip 67 enclosing the handle of the other bag as shown in FIG. 6.

The mounting arrangement for saddlebags 10, 12 will now be described. Each saddlebag is held by the cyclist next to the seat 14 at the approximate position where it is desired to be mounted. The user notes the location of the pair of D-rings 70, 70' on mounting plate 44 relative to the shape and contour of seat 14, generally the rear passenger portion 18 thereof to which the bags are usually attached. D-rings 70, 70' form part of an attachment subassembly comprised of a flexible strap 72, 72' having looped ends, the upper end of which is connected to D-rings 70, 70' and the lower ends thereof being connected to a generally rectangular ring 74, 74'. Strap 72, 72' is of sufficient length to pass through one of the pairs of receptacles provided by vertically adjacent slots 76 in attachment plate 44. There are a plurality of slot pairs longitudinally spaced along the length of plate 44 as can be seen most clearly in FIG. 4.

If the position of D-rings 70, 70' do not align with convenient harness mounting locations on seat 14, the attachment plate 44 is removed by unscrewing the fastening screws 46. The rectangular ring 74 is then twisted so that it can pass back through its associated slot pair to remove the subassembly. The subassembly is then mounted at the appropriately spaced slot pair by reversing the above noted procedure and resecuring the plate 44. The longitudinal length of ring 74 is longer than the length of slot 76 to thereby resist any tendency of the subassembly to be pulled through the slots.

The next step is to assemble the seat harness. The seat harness employs two pairs of straps, one forward on seat portion 18 and one pair on its rearward portion. However, the drawings, especially FIGS. 2-3, only show one strap of each pair but the same constructional details applies for other pairs of mating straps.

Seat hooks 80 are slipped onto each end of straps 82, 82'. Straps 82, 82' include loop-type Velcro material on their upper surfaces bridging the top surface of the seat. The ends of straps 82, 82' include pile-type Velcro materials 86 on the same surface as loop material 84. Consequently, the straps 82, 82' may be secured to spaced locations on seat portion 18 by cinching up each end of the straps and mating the pile material 86 thereon with the loop material 84 to secure the straps in place. The ends of straps 82, 82' also include a layer of Velcro loop material 88 on a surface opposite pile material 86. Such an arrangement provides an uninterrupted Velcro loop upper surface provided by Velcro loop sections 84 and 88.

A second pair of straps 90, 90' are utilized to connect saddlebags 10, 12 to straps 82, 82'. Straps 90, 90' include Velcro pile material 92 on major portions of their lower surfaces. Thus, upper straps 90, 90' may be detachably connected to their respective lower straps 82, 82' by mating together the two opposite Velcro materials as can be seen most clearly in FIG. 2. The opposite ends of straps 90, 90' include snap hooks 94 and 96. Snap hooks 94, 96 are removably connected to the laterally adjacent D-rings 70 on saddlebags 10 and 12, respectively. Suitable means such as a buckle (not shown) may be provided for adjusting the length of straps 90, 90' to accomodate different cycle configurations.

Giving special attention to FIG. 1 the next step is to secure a rigid front stablizer strap 98 to a stationary part of cycle 16. In the preferred embodiment stablizer strap 98 takes the form of an elongated strip of metal having a plurality of longitudally spaced holes 100 therein. The user aligns one of holes 100 with a threaded opening, preferably an existing one, in the cycle so that the strap 98 will extend at approximately a 45° angle. Then the strap 98 is bolted to the cycle part via bolt 102 and any excess length of the strap may be cut off. The upper most end of strap 98 includes a female buckle 104 such as a Fastex buckle. Each of the saddlebags 10, 12 include a flexible strap 106 extending from the rear of cutaway portion 38. Strap 106 includes a male Fastex buckle member 108 for connection with female buckle member 104. After the buckle members are connected together strap 106 is tightened by pulling on the ends of the strap passing through intermediate buckle 110.

As shown in FIG. 2 saddlebag 10 includes a rear stablizer strap 112 having a female Fastex buckle 114. Similarly, bag 12 includes rear stabilizer strap 116 having a male Fastex Buckle 118. The rear stablizer straps pass through the motorcycle hardware around the outside of the rear fender and the buckles 114, 118 are connected together.

It should now be appreciated that the saddlebags and associated mounting arrangement of this invention achieve a multitude of advantages. The bags themselves are of a rugged design capable of withstanding a good amount of road abuse. The stiffener panel 40 offers superior support and protection to the bag and its contents while preventing interference with the wheel of the cycle yet still keeping the bag lightweight. The internal frame construction serves to facilitate loading-/unloading of the bags and promotes even weight distribution of the objects therein by the action of bar 48 which transfers the load back to the entirety of stiffener panel 40. The cooperation of the rigid attachment plate 44 with the panel 40 also tends to distribute the weight of the bag and eliminate concentration of the forces on the bags that would otherwise be created if the harness snap hooks were connected directly to the fabric of the bags. The fully adjustable harness assembly adapts easily to a wide variety of motorcycles and enables the removal of each bag independently or together. The additional mounting components cooperate with the seat strap harness to hold the bag securely in place during travelling yet are easily detachable to enable manual carrying of the bags.

Still other advantages of the present invention will become apparent to one skilled in the art upon a study of the specification, drawings and following claims. For example, the Velcro material of the harness assembly. while preferred, may be replaced by other suitable fastening devices. Still other modifications will become apparent to the skilled practitioner and, therefore, the scope of the present invention should not be limited to the details of the preferred embodiment except as defined by the following claims.

We claim:

1. A saddlebag construction for moveably mounting saddlebags on a seat of a cycle, said saddlebag construction comprising:

A. at least one saddlebag formed of a flexible fabric material;

B. a substantially solid rigid stiffener panel positioned within said saddlebag adjacent the flexible inner panel of the saddlebag;

C. an elongated rigid attachment plate positioned longitudinally of and outside of said saddlebag adjacent said flexible inner panel and rigidly secured to said stiffener panel with said flexible inner panel of said saddlebag clampingly sandwiched therebetween;

D. a first pair of straps secured to spaced locations on the seat and having fabric fastening material of a first type on an upper surface thereof bridging the top surface of the seat;

E. a second pair of straps having a fabric fastening material of a second type on lower surfaces thereof removably mounted to the fabric fastening material of the first type on the first pair of straps; and F. fastener means on the ends of the second pair of straps detachably connected to spaced locations on said attachment plate.

2. The saddlebag construction of claim 1 wherein:

G. said saddlebag includes a shield detachably connected to major portions of the exterior inner face and at least a portion of the bottom of the bag.

3. The saddlebag construction of claim 1 which further comprises:

G. a generally U-shaped bar having opposed ends thereof connected to longitudinally spaced points on said stiffner panel, said bar having a central horizontally extending section connected to an outer top edge of the bag.

4. The saddlebag construction of claim 1 which further comprises:

G. a pair of saddlebags mounted on opposite sides of the seat, each saddlebag including a rear stabilizer strap connected thereon for mating with the connector of the other strap.

5. The saddlebag construction according to claim 1 which further comprises:

G. means for removably connecting a front portion of the saddlebag to a fixed part of the cycle.

6. The saddle bag construction of claim 5 wherein said removably connecting means comprises:

H. a rigid strap with a plurality of longitudinally spaced holes therein adapted to receive a fastener connected to the fixed part of the cycle, said strap including a connector on a distal end thereof; and I. a flexible strap connected to the bag extending from front portions thereof and having a connector for mating with the connector on the rigid strap.

7. The saddlebag construction of claim 1 wherein:

G. said attachment plate includes a plurality of spaced pairs of slots along the length thereof defining receptacles for attachment devices; and H. said saddlebag construction further includes at least two attachment devices, each one in a respective slot pair, adapted to be secured to the fastener means on the second straps.

8. The saddlebag construction of claim 29 wherein:

I. each of said attachment devices comprises a flexible strap passing through the slots of a given pair and having ring members on opposite ends thereof having a greater dimension than their respective slots, one of the rings being connected to the fastener means on the second pair of straps.

* * * * *

UNITED STATES PATENT AND TRADEMARK OFFICE
CERTIFICATE OF CORRECTION

PATENT NO. : 4,580,706

DATED : April 8, 1986

INVENTOR(S) : W. Shaun Jackson et al.

It is certified that error appears in the above-identified patent and that said Letters Patent is hereby corrected as shown below:

Column 2, line 21 delete "forward".

Signed and Sealed this

Ninth Day of September 1986

[SEAL]

Attest:

DONALD J. QUIGG

Attesting Officer  Commissioner of Patents and Trademarks